(12) United States Patent
Sithiravel et al.

(10) Patent No.: US 11,087,147 B2
(45) Date of Patent: Aug. 10, 2021

(54) VEHICLE LANE MAPPING

(71) Applicant: Ford Global Technologies, LLC, Dearborn, MI (US)

(72) Inventors: Rajiv Sithiravel, Scarborough (CA); David A. LaPorte, Livonia, MI (US); Kyle J. Carey, Ypsilanti, MI (US); Aakar Mehra, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 16/576,422

(22) Filed: Sep. 19, 2019

(65) Prior Publication Data

US 2021/0089791 A1 Mar. 25, 2021

(51) Int. Cl.
*G06K 9/00* (2006.01)
*G08G 1/16* (2006.01)

(52) U.S. Cl.
CPC ..... *G06K 9/00798* (2013.01); *G06K 9/00805* (2013.01); *G06K 9/00825* (2013.01); *G08G 1/167* (2013.01)

(58) Field of Classification Search
CPC ........... G06K 9/00798; G06K 9/00805; G06K 9/00825; G08G 1/167
See application file for complete search history.

(56) References Cited

U.S. PATENT DOCUMENTS

| 10,379,538 | B1 * | 8/2019 | Sheckells | ........... | B60W 60/0011 |
| 2007/0179685 | A1 * | 8/2007 | Milam | ................... | G01C 21/00 701/3 |

(Continued)

FOREIGN PATENT DOCUMENTS

| WO | 2016130719 A2 | 8/2016 |
| WO | 2018229552 A2 | 12/2018 |
| WO | 2019094843 A1 | 5/2019 |

OTHER PUBLICATIONS

Andreas Wedel, et. al., "B-Spline Modeling of Road Surfaces With an Application to Free-Space Estimation", IEEE Transactions on Intelligent Transportation Systems, vol. 10, No. 4, Dec. 2009, pp. 572-583 (12 pages).

*Primary Examiner* — Md K Talukder
(74) *Attorney, Agent, or Firm* — Frank A. MacKenzie; Bejin Bieneman PLC

(57) ABSTRACT

A computer, including a processor and a memory, the memory including instructions to be executed by the processor to generate a first map, based on vehicle sensor data, of a free space on a roadway in which a first vehicle can operate without contacting roadway edges and non-stationary objects on the roadway, the first map including roadway lane markings in an environment around the first vehicle, wherein the non-stationary objects include one or more second vehicles and generate a second map of free space in the environment around the first vehicle by determining B-splines corresponding to first roadway lanes based on the roadway lane markings and the roadway edges included in the first map. The instructions include further instructions to determine second roadway lanes based on determining locations of the non-stationary objects, determine combined roadway lanes based on the first roadway lanes and the second roadway lanes and operate the first vehicle based on the combined roadway lanes.

20 Claims, 12 Drawing Sheets

(56) References Cited

U.S. PATENT DOCUMENTS

| | | | |
|---|---|---|---|
| 2018/0032082 A1* | 2/2018 | Shalev-Shwartz | G06N 7/005 |
| 2019/0033871 A1* | 1/2019 | Lee | G05D 1/0212 |
| 2019/0377354 A1* | 12/2019 | Shalev-Shwartz | B60W 30/0956 |
| 2020/0124423 A1* | 4/2020 | Jiang | G05D 1/0088 |
| 2020/0341476 A1* | 10/2020 | Wuthishuwong | B60W 30/09 |
| 2020/0348696 A1* | 11/2020 | Mangharam | G08G 5/003 |

\* cited by examiner

VEHICLE LANE MAPPING

BACKGROUND

Vehicles can be equipped with computing devices, networks, sensors and controllers to acquire data regarding the vehicle's environment and to operate the vehicle based on the data. Vehicle sensors can provide data concerning features of routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
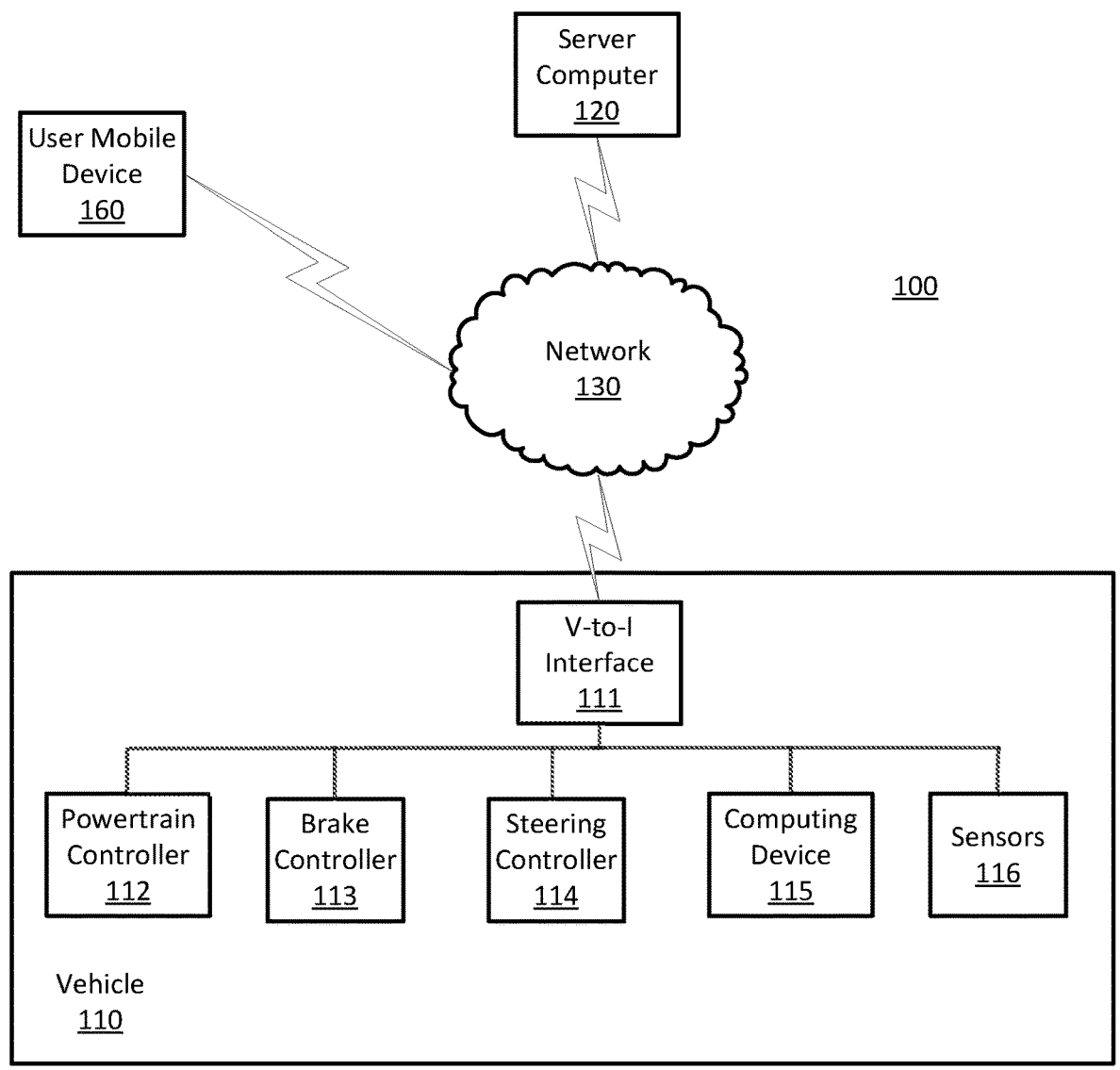
FIG. 1 is a diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more moving objects such as vehicles and pedestrians, etc., in an environment around a vehicle and can be used by a computing device in the vehicle to operate the vehicle.

Disclosed herein is method including generating a first map, based on vehicle sensor data, of a free space on a roadway in which a first vehicle can operate without contacting roadway edges and non-stationary objects on the roadway, the first map including roadway lane markings in an environment around the first vehicle, wherein the non-stationary objects include one or more second vehicles. A second map of free space in the environment around the first vehicle can be generated by determining B-splines corresponding to first roadway lanes based on the roadway lane markings and the roadway edges included in the first map, second roadway lanes can be determined based on determining locations of the non-stationary objects, combined roadway lanes can be determined based on the first roadway lanes and the second roadway lanes and the first vehicle can be operated based on the combined roadway lanes. The first roadway lanes and the second roadway lanes can be classified as one or more of a left lane, a right lane, a host lane and a non-relevant lane based on a location of the first vehicle. The vehicle sensor data can include one or more of video data, lidar data, and radar data.

The B-splines can be determined based on knots and controlled points, wherein the knots are points on the B-splines and the controlled points determine a shape of the B-splines between the knots based on third degree polynomial functions. Object tracks can be determined based on determining a plurality of locations of the non-stationary objects in data acquired by vehicle sensors at successive time steps. The plurality of locations can be combined using B-splines. The B-splines corresponding to the second roadway lanes can be based on the object tracks. The combined roadway lanes can be determined based on combining the B-splines corresponding to the first roadway lanes with the B-splines corresponding to the second roadway lanes. The B-splines corresponding to the second roadway lanes can be included in the combined roadway lanes when the first roadway lanes and the second roadway lanes do not match. The B-splines corresponding to the first roadway lanes can be included in the combined roadway lanes when the first roadway lanes and the second roadway lanes match. The first vehicle can be operated based on determining a steerable path polynomial based on the combined roadway lanes. The steerable path polynomial can be based on B-splines. Determining the steerable path polynomial can include determining B-splines at a lateral midpoint between the B-splines included in the combined roadway lanes. The first vehicle can be operated on the steerable path polynomial by controlling vehicle powertrain, steering, and brakes.

Further disclosed is a computer readable medium, storing program instructions for executing some or all of the above method steps. Further disclosed is a computer programmed for executing some or all of the above method steps, including a computer apparatus, programmed to generate a first map, based on vehicle sensor data, of a free space on a roadway in which a first vehicle can operate without contacting roadway edges and non-stationary objects on the roadway, the first map including roadway lane markings in an environment around the first vehicle, wherein the non-stationary objects include one or more second vehicles. A second map of free space in the environment around the first vehicle can be generated by determining B-splines corresponding to first roadway lanes based on the roadway lane markings and the roadway edges included in the first map, second roadway lanes can be determined based on determining locations of the non-stationary objects, combined roadway lanes can be determined based on the first roadway lanes and the second roadway lanes and the first vehicle can be operated based on the combined roadway lanes. The first roadway lanes and the second roadway lanes can be classified as one or more of a left lane, a right lane, a host lane and a non-relevant lane based on a location of the first vehicle. The vehicle sensor data can include one or more of video data, lidar data, and radar data.

The computer can be further programmed to determine B-splines based on knots and controlled points, wherein the knots are points on the B-splines and the controlled points determine a shape of the B-splines between the knots based on third degree polynomial functions. Object tracks can be determined based on determining a plurality of locations of the non-stationary objects in data acquired by vehicle sensors at successive time steps. The plurality of locations can be combined using B-splines. The B-splines corresponding to the second roadway lanes can be based on the object tracks. The combined roadway lanes can be determined based on combining the B-splines corresponding to the first roadway lanes with the B-splines corresponding to the second roadway lanes. The B-splines corresponding to the second roadway lanes can be included in the combined roadway lanes when the first roadway lanes and the second roadway lanes do not match. The B-splines corresponding to the first roadway lanes can be included in the combined roadway lanes when the first roadway lanes and the second roadway lanes match. The first vehicle can be operated based on determining a steerable path polynomial based on the combined roadway lanes. The steerable path polynomial can be based on B-splines. Determining the steerable path polynomial can include determining B-splines at a lateral midpoint between the B-splines included in the combined roadway lanes. The first vehicle can be operated on the steerable path polynomial by controlling vehicle powertrain, steering, and brakes.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
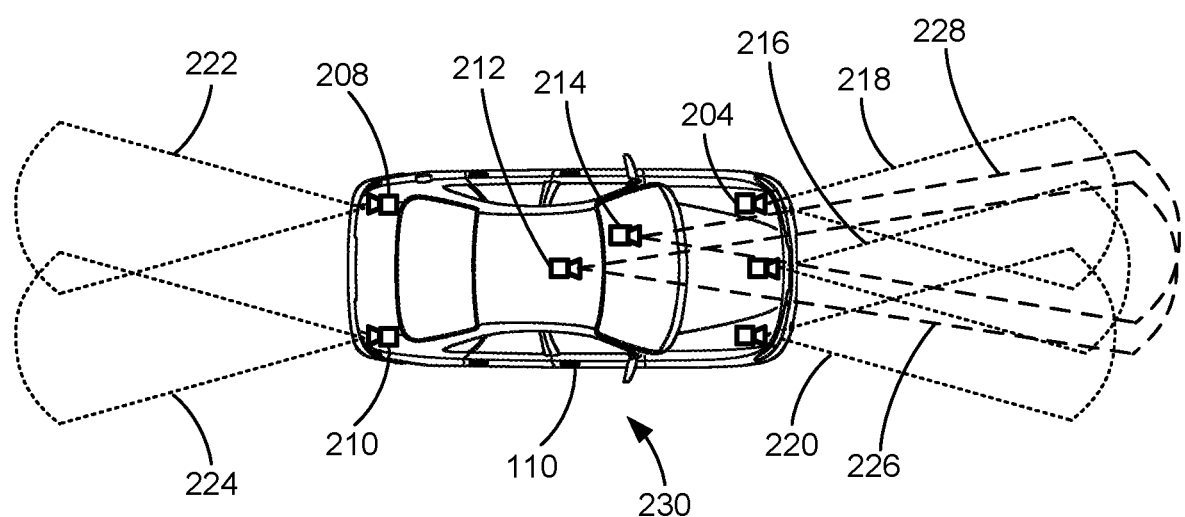
FIG. 2 is a diagram of an example vehicle including vehicle sensors.

FIG. 2 is a diagram of an example vehicle 110 including sensors 116 including a front radar sensor 202, left front radar sensor 204, right front radar sensor 206, left rear radar sensor 208, right rear radar sensor 210 (collectively radar sensors 230), lidar sensor 212 and video sensor 214 and their respective fields of view 216, 218, 220, 222, 224 (dotted lines) and 226, 228 (dashed lines). A field of view 216, 218, 220, 222, 224, 226, 228 is a 2D view of a 3D volume of space within which a sensor 116 can acquire data. Radar sensors 230 operate by transmitting pulses at microwave frequencies and measuring the microwave energy reflected by surfaces in the environment to determine range and doppler motion. Computing device 115 can be programmed to determine stationary objects and non-stationary objects in radar sensor 230 data. Stationary objects include roadways, curbs, pillars, abutments, barriers, traffic signs, etc. and non-stationary objects include other vehicles and pedestrians, etc. Detection of objects in a field of view 216, 218, 220, 222, 224 will be discussed below in relation to FIGS. 6 and 7. Processing detected stationary objects and non-stationary objects to determine a free space map with B-splines will be discussed below in relation to FIGS. 8-13. A lidar sensor 212 emits pulses of infrared (IR) light and measures the reflected IR energy reflected by surfaces in the environment in a field of view 226 to determine range. Computing device 115 can be programmed to determine stationary and non-stationary objects in lidar sensor data. A video sensor 214 can acquire video data from ambient light reflected by the environment of the vehicle within a field of view 228. A video sensor 214 can include a processor and memory programmed to detect stationary and non-stationary objects in the field of view.

Figure 3:
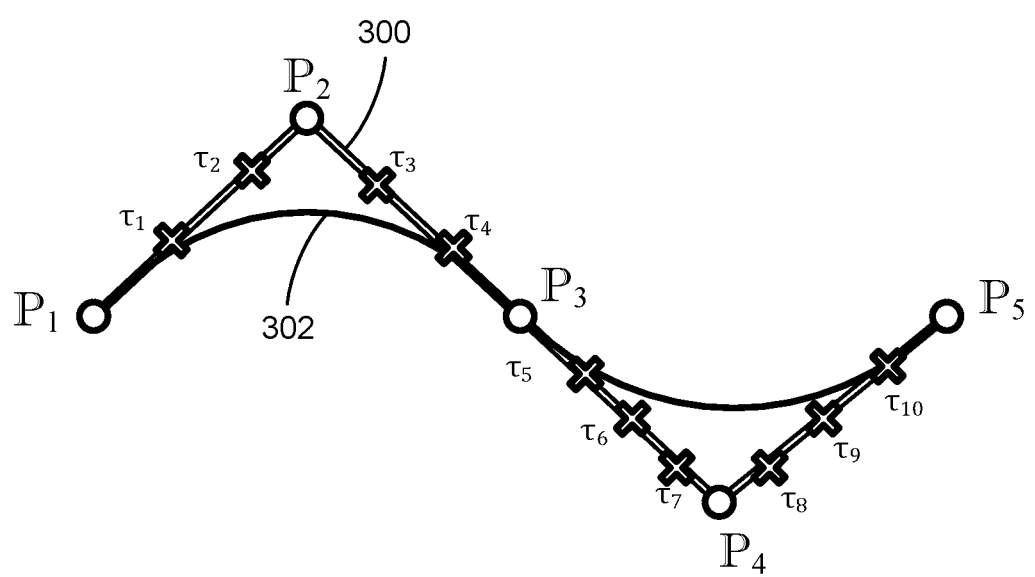
FIG. 3 is a diagram of an example B-spline.

FIG. 3 is a diagram of an example B-spline 300. A B-spline 300 is a polynomial function that can approximate a curve 302. A B-spline 300 is a set of joined polynomial functions that approximate a curve 302 defined by any function by minimizing a distance metric, for example Euclidian distance in 2D space, between B-spline 300 knots, represented by X's marked $t_1 \ldots t_{10}$ located on the polynomial functions that are joined at controlled points $[\mathbb{P}_i]_{i=1}^5$, and a point on the curve 302, for example. A B-Spline can be multi-dimensional with accompanying increases in computational requirements. A knot can be a multi-dimensional vehicle state vector including location, pose and accelerations, and the distance metric can be determined by solving sets of linear equations based on the vehicle state vectors. A B-spline is defined by controlled points where controlled points $[\mathbb{P}_i]_{i=1}^5$ are located based on having a predetermined number of knots (X's), for example 2 or 3, between each pair of controlled points $[\mathbb{P}_i]_{i=1}^5$, joined by a polynomial function.

The selection of controlled points $[\mathbb{P}_i]_{i=1}^5$ is based on dividing the knots of a B-spline 300 into polynomial segments with about the same number of knots per segment, for example two or three knots. The first controlled point $[\mathbb{P}_i]_{i=1}^5$ is selected to be at the origin of the curve 302. The second controlled point $[\mathbb{P}_i]_{i=1}^5$ is selected to be two or three knots away, in a direction that minimizes the distance between the knots and the curve 302. The next controlled point $[\mathbb{P}_i]_{i=1}^5$ is selected to be two or three knots away from the second controlled point $[\mathbb{P}_i]_{i=1}^5$ in a direction that minimizes the distance between the curve 302 and the knots, and so forth until the last controlled point $[\mathbb{P}_i]_{i=1}^5$ is selected to match the end of curve 302. The selection of the number and location of knots on polynomial functions can be based on a user input number of samples per second and the speed of vehicle 110, for example, wherein a vehicle speed divided by the sample rate yields the distance between adjacent knots on the polynomial function. In example B-spline 300 the polynomial functions are of degree one (straight lines). Higher order polynomial functions can also be of degree two (parabolic), three (cubic) or more.

The movement of any controlled point $[\mathbb{P}_i]_{i=1}^5$ will affect the B-spline and the effect can be on the entire B-spline (global effect) or in a certain part of the B-spline (local effect). A benefit of using a B-spline is its local controllability. Each segment of the curve between the controlled points $[\mathbb{P}_i]_{i=1}^5$ is divided into smaller segments by the knots. The total number of knots is always greater than the total number of controlled points $[\mathbb{P}_i]_{i=1}^5$. Adding or removing knots using appropriate controlled point movement can more closely replicate curve 302, which is suitable for implementing filtering algorithms using splines. Also, a higher order (3 or more) B-spline 300 tends to be smooth and maintains the continuity of the curve, where the order of a B-spline 300 is the order of the polynomial function, e.g. linear, parabolic or cubic or $1^{st}$, $2^{nd}$, or $3^{rd}$ order, for example.

Figure 4:
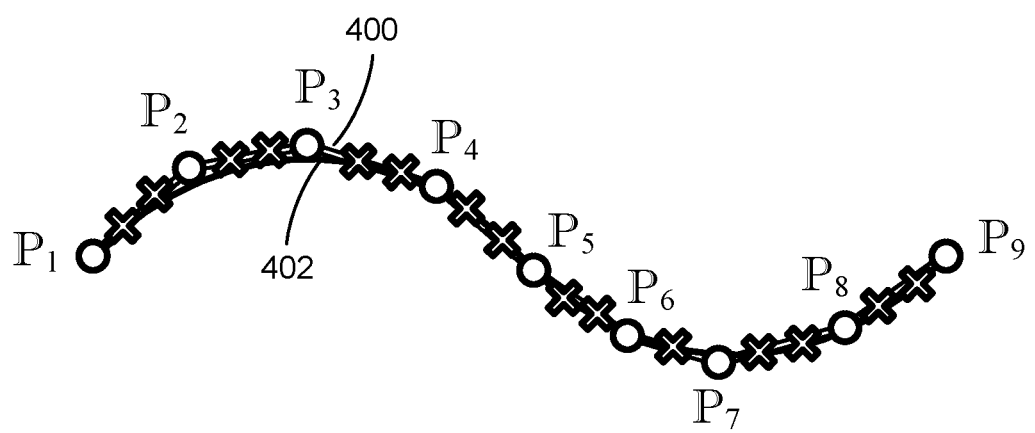
FIG. 4 is a diagram of another example B-spline.

FIG. 4 is a diagram of a B-spline 400 (double line). A B-spline 400 can approximate a curve 402 more closely than B-spline 300 by adding more controlled points $[\mathbb{P}_i]_{i=1}^9$ and knots, marked by "X" on the B-spline segments between controlled points $[\mathbb{P}_i]_{i=1}^9$. With increasing number of knots, the B-spline 400 converges to the curve 402. A p-th order B-spline curve C(x) of a variable x (e.g., multitarget state) is defined as $$C(x) = \Sigma_{i=1}^{n_s} \mathbb{P}_i B_{i,p,t}(x) \quad 2 \le p \le n_s \qquad (1)$$

where $\mathbb{P}_i$ is the i-th controlled point and $n_s$ is the total number of controlled points. The B-spline blending functions or basis functions are denoted by $B_{i,p,t}(x)$. Blending functions are polynomials of degree p−1. The order p can be chosen from 2 to $n_s$ and the continuity of the curve can be kept by selecting p≥3. The knot denoted by t is a 1×τ vector and t is a non-decreasing sequence of real numbers, where t={$t_1, \ldots, t_\tau$}, i.e., $t_i \le t_{i+1}$, i=1, ..., τ. The knot vector relates the parameter x to the controlled points. The shape of any curve can be controlled by adjusting the locations of the controlled points. The i-th basis function can be defined as $$B_{i,p,t}(x) = \frac{(x - t_i) B_{i,p-1}(x)}{t_{i+p-1} - t_i} + \frac{(t_{i+p-1} - x) B_{i-1,p-1}(x)}{t_{i+p} - t_{i+1}} \qquad (2)$$

where, $t_i \le x \le t_{i+p}$ and $$B_{i,p,t}(x) = \begin{cases} 1 & \text{if } t_i \le x \le t_{i+1}, \\ 0 & \text{otherwise} \end{cases} \qquad (3)$$

where variables $t_i$ in (2) denote a knot vector. The basis function $B_{i,p,t}(x)$ is non-zero in the interval [$t_i$, $t_{i+p}$]. The basis function $B_{i,p}$ can have the form 0/0 and assume 0/0=0. For any value of the parameter, x, the sum of the basis functions is one, i.e., $$\Sigma_{i=1}^{n_s} B_{i,p}(x) = 1 \qquad (4)$$

Unidimensional splines can be extended to multidimensional ones through the use of tensor product spline construction.

For a given basic sequence of B-splines $\{B_{i,p,t}\}_{i=1}^{n_s}$ and strictly increasing sequence of data series $\{x_j\}_{j=1}^{n_s}$ the B-spline interpolation function ĉ(x) can be written as $$\hat{c}(x) = \Sigma_{i=1}^{n_s} \mathbb{P}_i B_{i,p,t}(x) \qquad (5)$$

where ĉ(x) agrees with function c(x) at all $x_j$ if and only if $$\Sigma_{i=1}^{n_s} \mathbb{P}_i B_{i,p,t}(x_j) = c(x_j), \text{ for } j=1, \ldots, n_s \qquad (6)$$

Equation (6) is a linear system of $n_s$ equations with $n_s$ unknown values of $\mathbb{P}_i$ and the i-th row and j-th column of the coefficient matrix equals $B_{i,p,t}(x_j)$, which means that the spline interpolation function can be found by solving a set of linear system equations. The coefficient matrix can be verified for invertibility using the Schoenberg-Whitney theorem. The Schoenberg-Whitney theorem can be described as follows: Let t be a knot vector, p and n be integers such that n>p>0, and suppose x is strictly increasing with n+1 elements. The matrix $L = \Sigma_{i=1}^{n_s} \mathbb{P}_i B_{i,p,t}(x_j)$ from (6) is invertible if and only if $\Sigma_{i=1}^{n_s} \mathbb{P}_i B_{i,p,t}(x_j) \ne 0$, i=0, ..., n, i.e., if and only if $t_i < x_i < t_{i+p+1}$, for all i.

The B-spline transformation can be applied to single and multidimensional statistical functions, e.g., a probability density function and a probability hypothesis density function, without any assumption to account for noise. The B-spline transformation can be derived using the spline approximation curve (SAC) or the spline interpolation curve (SIC) techniques. The difference between these two spline transformations is that the SAC does not necessarily pass through all controlled points but must go through the first and the last ones. In contrast, the SIC must pass through all controlled points. The example B-spline transformation discussed herein uses the SIC implementation. B-spline-based target tracking can handle a continuous state space, makes no special assumption on signal noise, and is able accurately approximate arbitrary probability density or probability hypothesis density surfaces. In most tracking algorithms during the update stage, the states are updated, but in B-spline based target tracking only the knots are updated.

Figure 5:
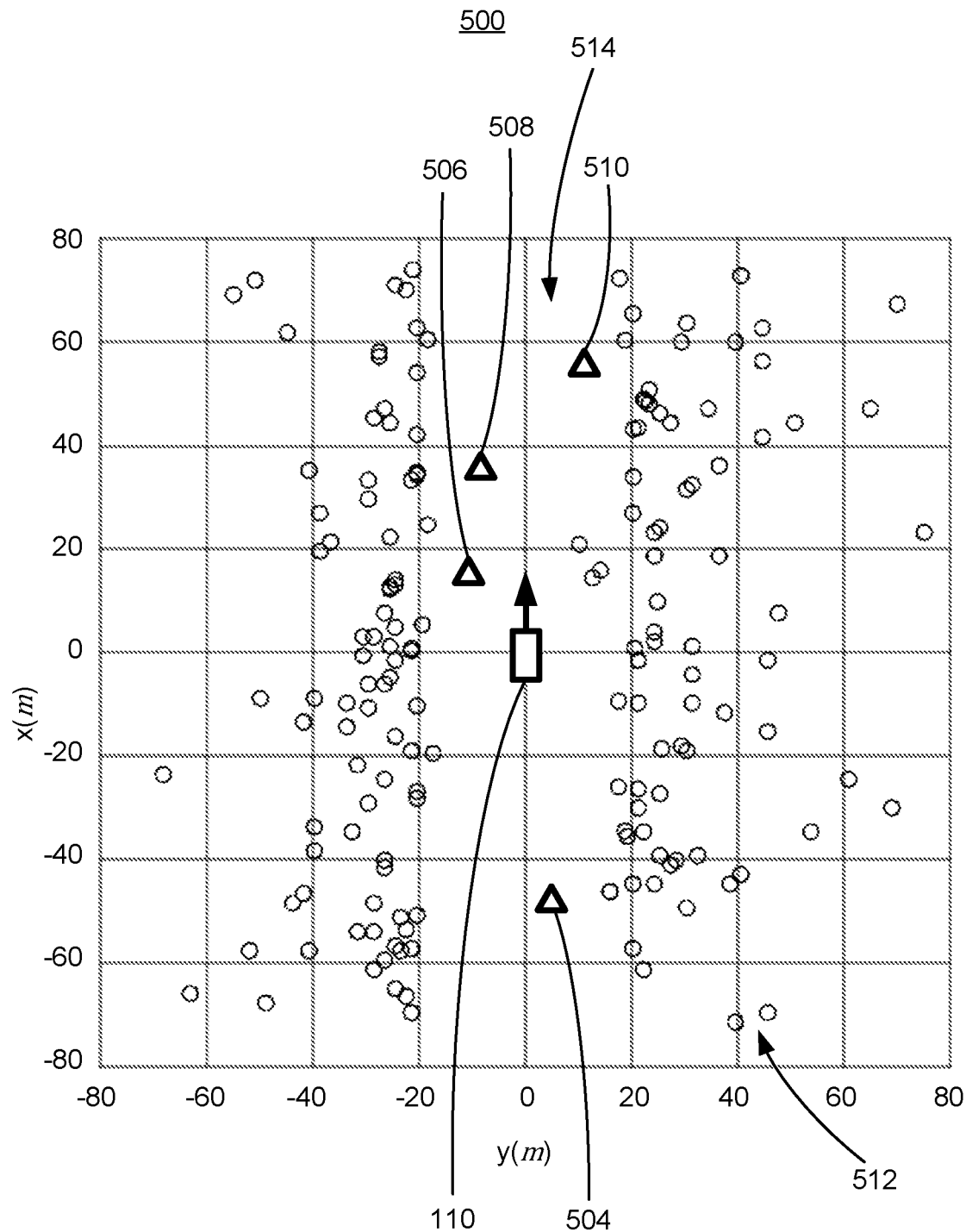
FIG. 5 is a diagram of example vehicle sensor data.

FIG. 5 is a diagram of a traffic scene 500 including vehicle sensor data points 512 (circles) acquired by sensors included in a vehicle 110 as it travels on a roadway. Direction of travel for vehicle 110 is denoted by the arrow attached to the icon corresponding to vehicle 110. Vehicle sensor data points 512 correspond to one or more of lidar sensor range data or radar sensor reflections. Vehicle sensor data points 512 are lidar or radar data points returned by objects located outside of a roadway 514 region in traffic scene 500. Roadway 513 corresponds to a region that does not return lidar or radar reflection data because the roadway does not include surfaces substantially perpendicular to lidar (infrared) or radar (microwave) beams of electromagnetic energy which reflect the electromagnetic energy back to receivers on vehicle 110 to be acquired as data points 512. Traffic scene 500 also includes data points identified as vehicles 504, 506, 508, 510 (triangles) by a computing device 115 included in vehicle 110. Vehicles 504, 506, 508, 510 can be identified by the strength of the return for radar data and by the shape of the returned data for lidar data, for example.

Vehicle sensor data points 512 can be used to determine a map of free space corresponding to a roadway by extending lines radially outwards from vehicle 110 until they encounter a vehicle data point 512. The vehicle data points 512 can be filtered to remove all vehicle data points 512 except the vehicle first data point 512 that contacts a radial line extending from vehicle 110. The subset of vehicle data points 512 that meet the criterion of being the first point contacted along a radial line from vehicle 110 can be connected by B-splines as described in relation to FIGS. 3 and 4 above. B-splines formed by connecting the subset of vehicle data points 512 corresponding to first contact with radial lines from a vehicle 110 can form the edges of a roadway.

Figure 6:
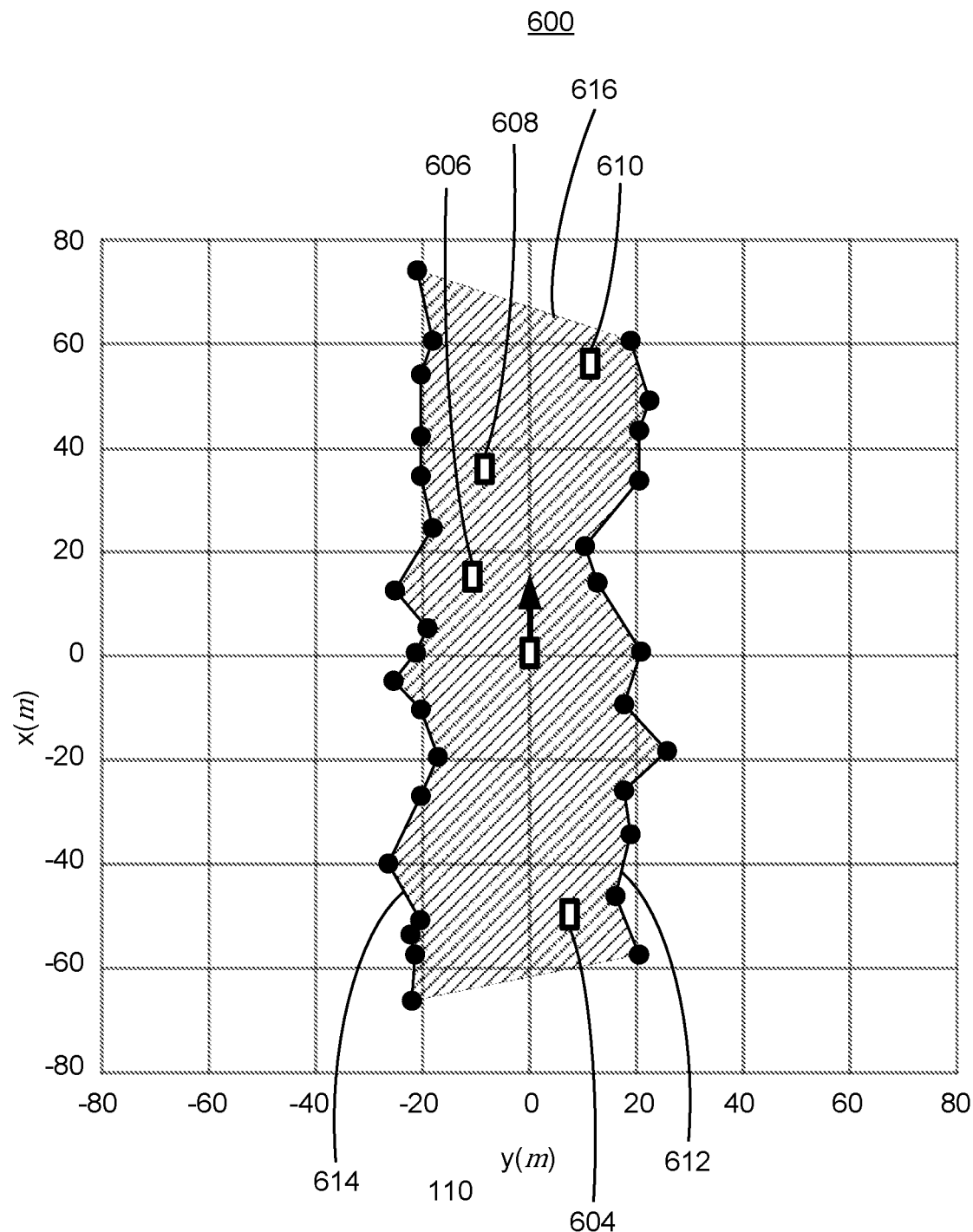
FIG. 6 is a diagram of an example map of roadway free space.

FIG. 6 is a diagram of a traffic scene 600 including a map of roadway free space 616 (shaded). Roadway free space 616 is defined by B-splines 612, 614 formed by connecting subsets of vehicle data points 512 formed by contact with radial lines extended from vehicle 110 as discussed above in relation to FIG. 5, above. Map of roadway free space 616 includes icons corresponding to vehicles 604, 606, 608, 610 identified in vehicle sensor data. Vehicles 604, 606, 608, 610 correspond to non-stationary objects identified in the map of roadway free space 616.

Non-stationary objects can be identified by doppler radar returns, where velocity of a non-stationary object with respect to a roadway can be determined by measuring the doppler shift of a radar return from an object and comparing it to the doppler shift from background objects, which correspond to the speed of the vehicle 110. Non-stationary objects can also be determined by processing a sequence of lidar data points at similar radial directions from the vehicle 110 acquired at successive time steps. The change in location of the lidar data points with respect to time steps will determine the velocity of the data points with respect to a vehicle 110, where background data points will be determined to have a velocity proportional to the cosine of the radial angle with respect to the direction of motion of the vehicle 110 times the vehicle 110 velocity, for example. Lidar data points that do not have a velocity proportional to the cosine of the radial angle of the data points times the velocity of the vehicle can be determined to correspond to non-stationary objects.

A computing device 115 in a vehicle 110 can use a map or roadway free space including non-stationary objects corresponding to vehicle 604. 606. 608, 610 to determine a vehicle path polynomial along which to operate vehicle 110. A vehicle path polynomial can be a polynomial function that includes a series of n connected points in the X, Y plane that includes predicted vehicle 110 trajectories at n future time steps. The n connected points are determined by a polynomial function in the X, Y plane, where the X, Y axes are determined by the direction of vehicle 110, with the X direction being parallel to the direction of travel and the Y direction being perpendicular to the direction of travel, for example. In this example n future time steps, where n can be a large number, greater than 100 for example, can be represented by a polynomial of degree k, where, in this case, k can be a number less than or equal to 3. The n connected points in a vehicle path polynomial can be represented by a polynomial function in X and Y of degree k or less.

A polynomial function in X and Y of degree k or less that represent the vehicle path polynomial can include one or more B-splines. As discussed above in relation to FIGS. 3 and 4, B-splines are polynomial functions of degree k or less that each represent a disjoint subset of the n points, and that taken together, represent the entire set of n points. B-splines can be constrained to be continuously differentiable and have constraints or limits on the permitted derivatives, e.g. limits on the rates of change, with no discontinuities. B-splines can also be constrained to match derivatives with other B-splines at boundaries, providing smooth transitions between subsets. Constraints on B-splines can make a vehicle path polynomial a steerable path polynomial by limiting the rates of longitudinal and lateral accelerations required to pilot a vehicle along the vehicle path polynomial, where braking torque and powertrain torque are applied as positive and negative longitudinal accelerations and clockwise and counter clockwise steering torque are applied as left and right lateral accelerations. By determining lateral and longitudinal accelerations to achieve predetermined target values within predetermined constraints within predetermined numbers of time periods, the vehicle path polynomial can be constrained to provide a vehicle path can be operated upon by vehicle 110 without exceeding limits on lateral and longitudinal accelerations while avoiding contact with an object, for example.

Figure 7:
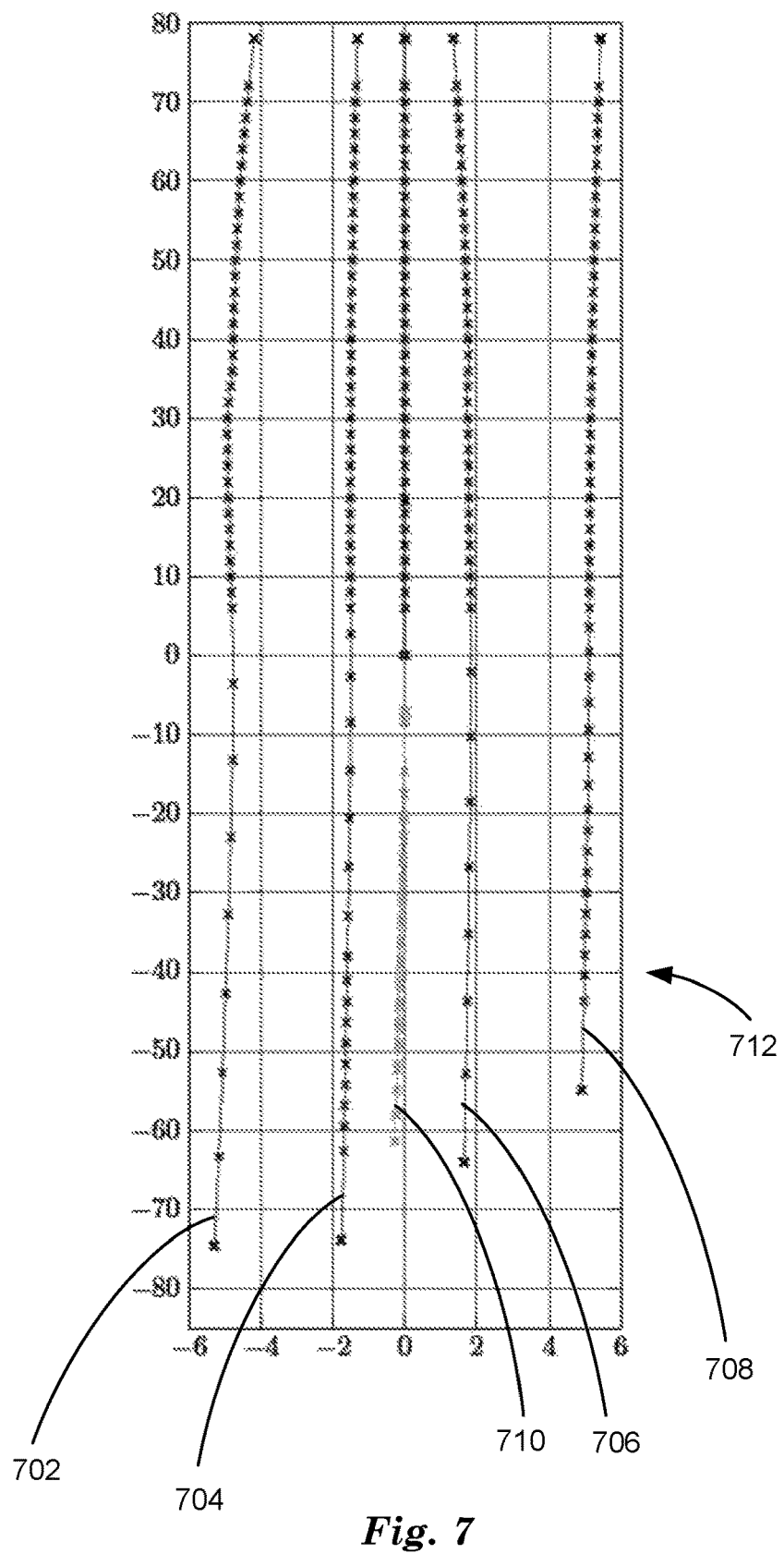
FIG. 7 is a diagram of example roadway lane markings.

FIG. 7 is a diagram of a vehicle coordinate system graph 700 including roadway lane markings 702, 704, 706, 708, collectively roadway lane markings 712 and a vehicle path polynomial 710. Vehicle coordinates system graph 700 is a graph illustrating a roadway around a vehicle 110 at coordinates 0, 0 on the vehicle coordinates system graph 700. The X axis measures lateral distances in meters from the center of vehicle 110 at coordinates 0, 0 and the Y axis measures longitudinal distances in meters from the center of vehicle 110 at coordinates 0, 0. Vehicle path polynomial 710 illustrates measured locations of vehicle 110 (negative coordinates) and predicted future locations of vehicle 110 (positive coordinates).

Roadway lane markings 712 are based on vehicle sensor data acquired by vehicle 110 at it travels on a roadway. The vehicle sensor data can include video data acquired by video sensors arranged to view the roadway ahead, to the side and behind the vehicle 110. In examples where only forward-looking video sensors are available, portions of lane markings 712 corresponding to locations behind the vehicle 110 (negative coordinates) can be determined based on previously acquired video and stored at computing device 115. The roadway lane markings 712 can be determined by identifying and locating roadway lane markings in video data using machine vision techniques to process the acquired video data.

Roadway lane markings can be visible in video data as contrasting lines, typically white or yellow in color, visible against a typically black roadway background. Roadway lane markings can be determined using Hough transforms, for example, to identify and locate straight lines corresponding to the roadway lane markings, where the roadway lane markings can be continuous or broken into segments. The output from a Hough transform can correspond to equations for straight line segments in intercept, slope format, where straight line segments can be joined to form continuous lines by recognizing common slopes and intercepts within a user determined tolerance. Straight lines determined by a Hough transform can be transformed from a field of view of a video sensor to a top down view like vehicle coordinate system graph 700 by determining a plane in three-dimensional space corresponding to the roadway based on the determined straight lines and video sensor parameters including a three-dimensional orientation of the field of view of the video sensor including the magnification of a lens included in the video sensor. Straight lines corresponding to roadway lane markings can be transformed from a plane assumed to be parallel to the roadway to a top-down view of the environment around the vehicle 110 based on the difference between the three-dimensional angle of the optical axis of the video sensor, assumed to be the center of the lens and the center of the video sensor, and a line perpendicular to the top-down view which passes through the point at which the optical axis intersects the plane parallel to the roadway.

The transformed roadway lane markings can be filtered to reject false alarms by determining where the roadway lane markings can be expected to occur based on the map of roadway free space 616, where roadway lane markings 712 can be expected to occur in the vicinity of the B-splines 612, 614 and at locations at about 4 meter intervals parallel to the B-splines 612, 614, for example. Roadway lane markings 712 can be formed by selecting data points included in the transformed roadway lane markings based on acquired video data processed using Hough transforms and transformed into a top-down vehicle coordinate system graph 700. The selected data points can be connected along longitudinal directions using B-splines as described above in relation to FIGS. 3 and 4, above, to form roadway lane markings 712.

In examples of computing devices 115 used to determine roadway lane markings 712, data points corresponding to roadway lane markings in acquired video data can be determined by a Mobileye collision avoidance system (Mobileye, an Intel Company, 1350 Broadway, Suite 1600, New York, N.Y. 10038). A Mobileye collision avoidance system includes one or more video cameras and computing hardware and software that processes acquired video data to determine roadway lanes, objects including other vehicles, bicycles and pedestrians. A Mobileye collision avoidance system can determine probabilities of collision with objects including vehicles, bicycles and pedestrians, warn of lane departure, provide warnings related to distance to a leading vehicle in traffic and warn when speed limits are exceeded. A Mobileye system can also output a vehicle coordinate system graph 700 that includes data points corresponding to roadway lane markings, edges of roadways, stationary objects and non-stationary objects on a roadway in an environment around a vehicle 110.

Figure 8:
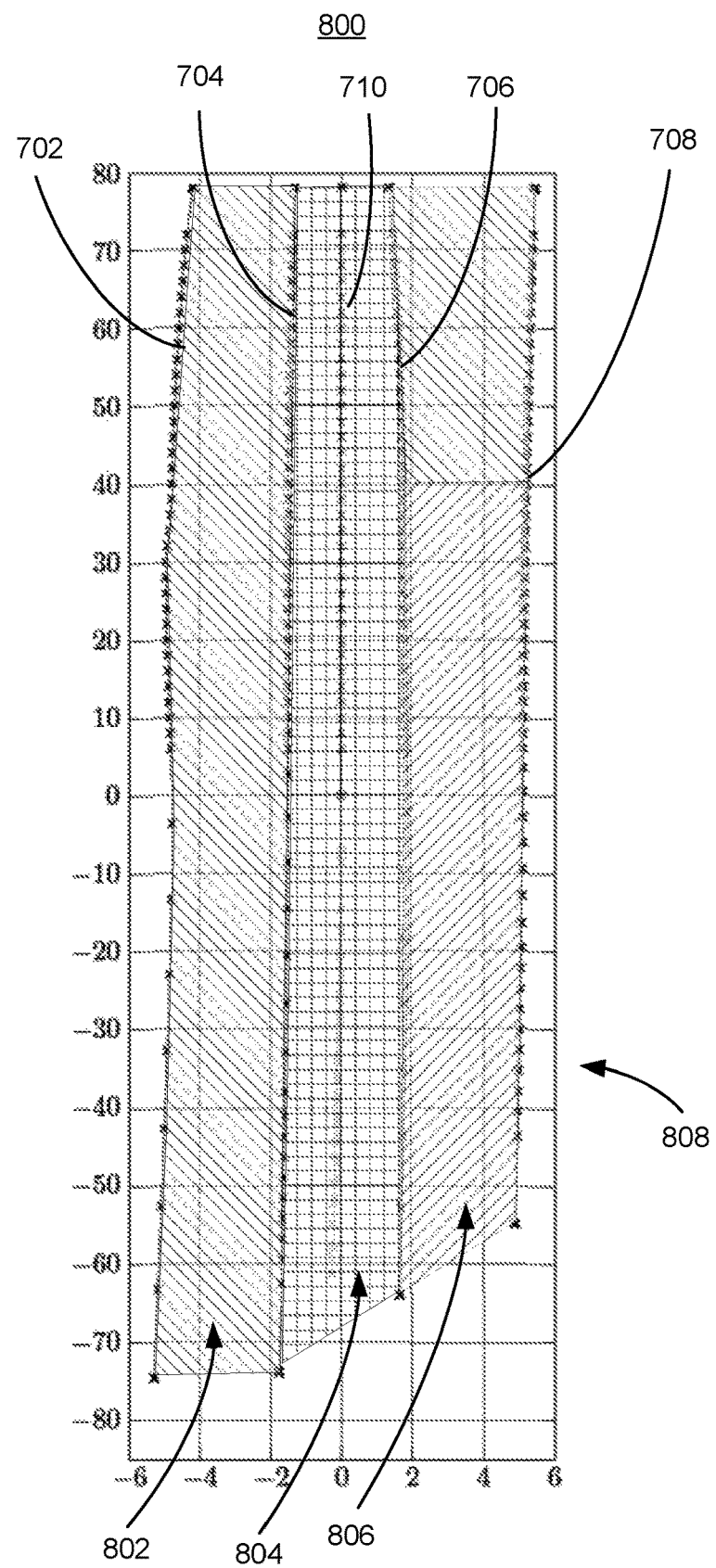
FIG. 8 is a diagram of example roadway lanes.

FIG. 8 is a diagram of a vehicle coordinate system graph 800 including left roadway lane 802 (left diagonal shading), host roadway lane 804 (grid shading), and right roadway lane 806 (right diagonal shading), collectively roadway lanes 808 based on roadway lane markings 712. Roadway lanes 802, 804, 806 are based on forming polygons between the roadway lane markings 712 in directions lateral to the roadway. Polygons formed between the roadway lane markings 712 can be combined to form roadway lanes 808 that fill regions between the roadway lane markings 712. Roadway lanes 808 can be classified as a left roadway lane 802, a host roadway lane 804, a right roadway lane 804 or a non-relevant roadway lane based on the location of a vehicle path polynomial 710 corresponding to the location of a host vehicle 110. A computing device 115 can classify roadway lanes 808 by determining the location of the roadway lanes with respect to the roadway lane that includes vehicle path polynomial 710 corresponding to the roadway lane in which vehicle 110 is traveling. Non-relevant lanes are roadway lanes that are not adjacent to a host roadway lane 804.

Techniques described herein improve operation of a vehicle 110 on a roadway by determining a host roadway lane 804, a left roadway lane 802, a right roadway lane 804 and non-relevant roadway lanes based on determining roadway lane markings 712 and a vehicle path polynomial 710. Computing device 115 can use the roadway lanes 802, 804, 806 to determine a vehicle path polynomial 710 that stays in a host roadway lane 804 and avoids crossing into an adjacent left roadway lane 802 and right roadway lane 806 and thereby avoid contacting vehicles or objects traveling on a roadway.

Figure 9:
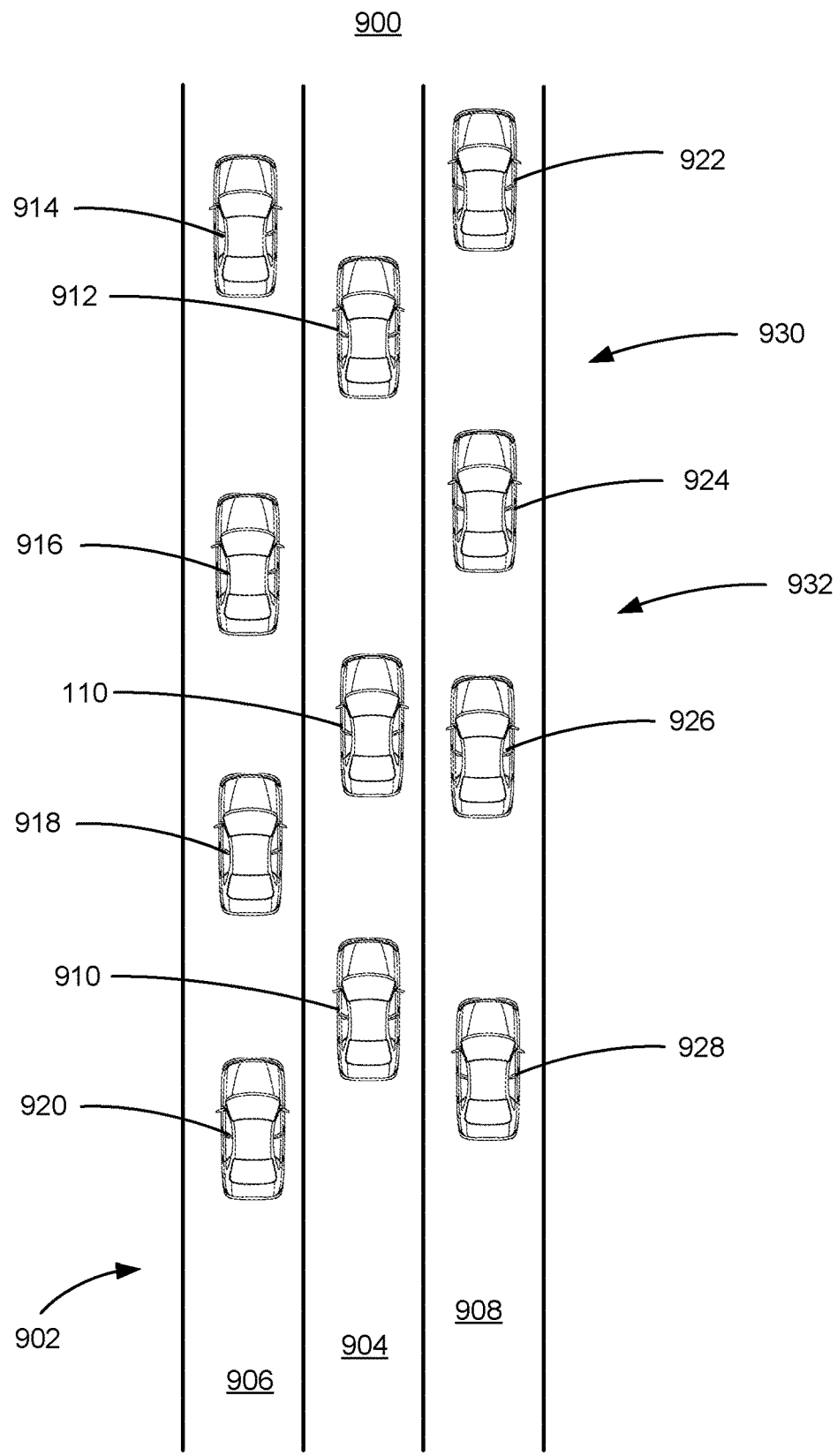
FIG. 9 is a diagram of example traffic scene including vehicles on a roadway.

FIG. 9 is a diagram of an example traffic scene 900 including vehicles 110, 910, 912, 914, 916, 918, 920, 922, 924, 926, 928, collectively vehicles 930, traveling in a left lane 906, a host lane 904, and a right lane 908, collectively roadway lanes 902, where the lanes are designated with respect to host vehicle 110 as discussed above in relation to FIG. 8. Traffic scene 900 includes vehicles 916, 918, 920 traveling in a left roadway lane 906, vehicles 912, 910 traveling before and after a host vehicle 110 in a host vehicle lane 906, respectively, and vehicles 922, 924, 926, 928 traveling in a right roadway lane 908. A computing device 115 can improve the classification of roadway lanes 902 by tracking vehicles 930 to form vehicle path polynomials and assigning each vehicle path polynomial to a roadway lane 902 based on the location of the vehicle path polynomial. Tracking vehicles 930 can include determining successive locations for one or more vehicles 930 in vehicle sensor data and forming vehicle path polynomials as discussed above in relation to FIG. 7 based on the successive vehicle locations. Vehicle 930 locations can be determined using machine vision techniques including deep neural networks to location non-stationary objects in vehicle sensor data, including video sensors, lidar sensor and radar sensors.

Locating one or more vehicles 930 in vehicle sensor data can be computationally expensive, meaning that a computing device 115 can only locate and track a limited number of vehicles while a vehicle 110 is traveling on a road. In order to permit the computing device 115 to complete vehicle location and tracking tasks in time to provide data for operation of a vehicle 110, vehicles 930 can be down selected. Down selecting is the process in which the number of vehicles 930 to be located and tracked is reduced. Down selecting can be accomplished by selecting a subset of vehicles 930 based on proximity to a host vehicle 110. Down selecting can select a subset of vehicles 930 by selecting only the closest vehicles 930 to host vehicle 110. For example, vehicles 916, 918 in left roadway lane 906 and vehicles 926, 924 in right roadway lane can be down selected based on selecting one vehicle 916 from the left roadway lane 906 and one vehicle 924 from the right roadway lane 908 in front of the host vehicle 110 and one vehicle 918 from the left roadway lane 906 and one vehicle 926 from the right roadway lane 908 behind the host vehicle 110. In addition, one vehicle 912 ahead of the host vehicle 110 in the host vehicle lane 906 and one vehicle 910 behind the host vehicle 110 can be down selected.

Down selecting the set of all vehicles 930 in this fashion results in a set of down selected vehicles 910, 912, 916, 918, 926, 924, collectively down selected vehicle 932, which reduces the computational load on computing device 115 permitting computing device 115 to determine tracking data for the down selected vehicles 932 while the host vehicle 110 is traveling on the roadway thereby permitting the computing device 115 to use the tracking data to determine vehicle path polynomials for the down selected vehicles 932. Techniques discussed herein can improve operation of a host vehicle 110 by combining vehicle path polynomials based on the down selected vehicles 932 with roadway lane 808 data and use the combined roadway lane data to determine a vehicle path polynomial 710 upon which to operate the host vehicle 110.

Figure 10:
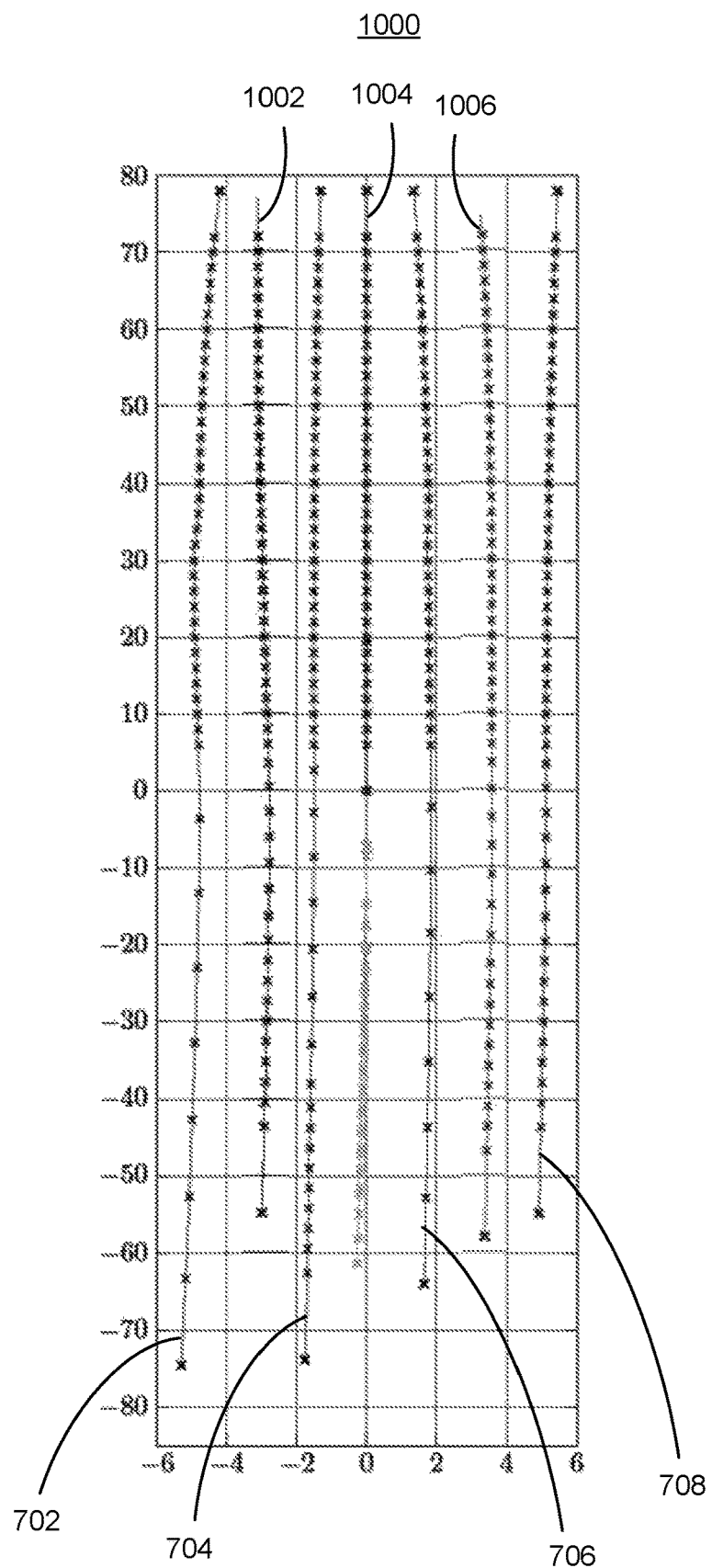
FIG. 10 is a diagram of example roadway lanes based on vehicle tracks.

FIG. 10 is a diagram of a vehicle coordinate system graph 1000 including vehicle path polynomials 1002, 1004, 1006 determined based on down selected vehicles 932 and roadway lane markings 712 determined as discussed above in relation to FIG. 7. Vehicle path polynomials 1002, 1004, 1006 are determined based on locations of down selected vehicles 932 as discussed in relation to FIG. 9. Each down selected vehicle 932 can be tracked by a computing device 115 included in a host vehicle 110, where tracking is defined as determining a location for each down selected vehicle 932 in a sequence of vehicle sensor data sets acquired at successive time steps as the host vehicle 110 travels on a roadway. Vehicle sensor data sets can be video images, lidar point cloud data or radar return data, for example. A computing device 115 can process the vehicle sensor data sets to determine locations for each down selected vehicle 932 in a succession of vehicle sensor data sets. The resulting locations can be mapped on a vehicle coordinate system graph 1000 and the mapped locations divided into groups based on the roadway lane markings 712, where the locations that occur in the space between the roadway lane markings 712 are included in a group. Each group of locations can then be joined together using B-splines as discussed above in relation to FIGS. 3 and 4 to form vehicle path polynomials 1002, 1004, 1006.

Second roadway lanes can be determined based on the vehicle path polynomials 1002, 1004, 1006 determined based on the down selected vehicles 932 by assuming that each of the vehicle path polynomials occur in the lateral center of a roadway lane and the roadway lane has a width equal to the average width of the roadway lanes 808 determined based on roadway lane markings 712. The determined second roadway lanes can be adjusted to eliminate overlap and gaps in the lateral direction relative to the roadway. The second roadway lanes can be combined with the first roadway lanes 808 to produce combined roadway lanes. Techniques for combining second roadway lanes with first roadway lanes 808 can include using the second roadway lanes to increase the confidence of the first roadway lanes 808 in portions of the combined roadway lanes where the first roadway lanes 808 and the second roadway lanes coincide. In portions of the combined roadway lanes where first roadway lanes 808 and second roadway lanes do not coincide, the first roadway lanes 808 can be deleted and the second roadway lanes retained. This will cause the combined roadway lanes to be based on vehicle path polynomials 1002, 1004, 1006 based on the down selected vehicles 932.

Determining vehicle path polynomials 1002, 1004, 1006 based on down selected vehicles 932 can improve classification of first roadway lanes 808 by comparing the first roadway lanes 808 determined based on roadway lane markings 712 to the second roadway lanes determined based on vehicle path polynomials 1002, 1004, 1006 determined based on down selected vehicles 932. Each second roadway lane should match its respective first roadway lane 808, where the center or each second roadway lane should not deviate from the center of its matching roadway lane 808 by more than one-half of the lane width which is equal to more than plus or minus one meter along its longitudinal length. If a second roadway lane based on down selected vehicles 932 differs from its corresponding first roadway lane 808 by more than plus or minus one meter, it can be assumed that an error has been made in determining the first roadway lane 808. The computing device 115 can determine a vehicle path polynomial 710 for operating the host vehicle 110 based on the combined roadway lanes, where the combined roadway lanes include portions based on the second roadway lanes where the first roadway lanes 808 differ from the second roadway lanes because avoiding down selected vehicles 932 is a high priority task and the second roadway lanes are based on measured locations of down selected vehicles 932.

Figure 11:
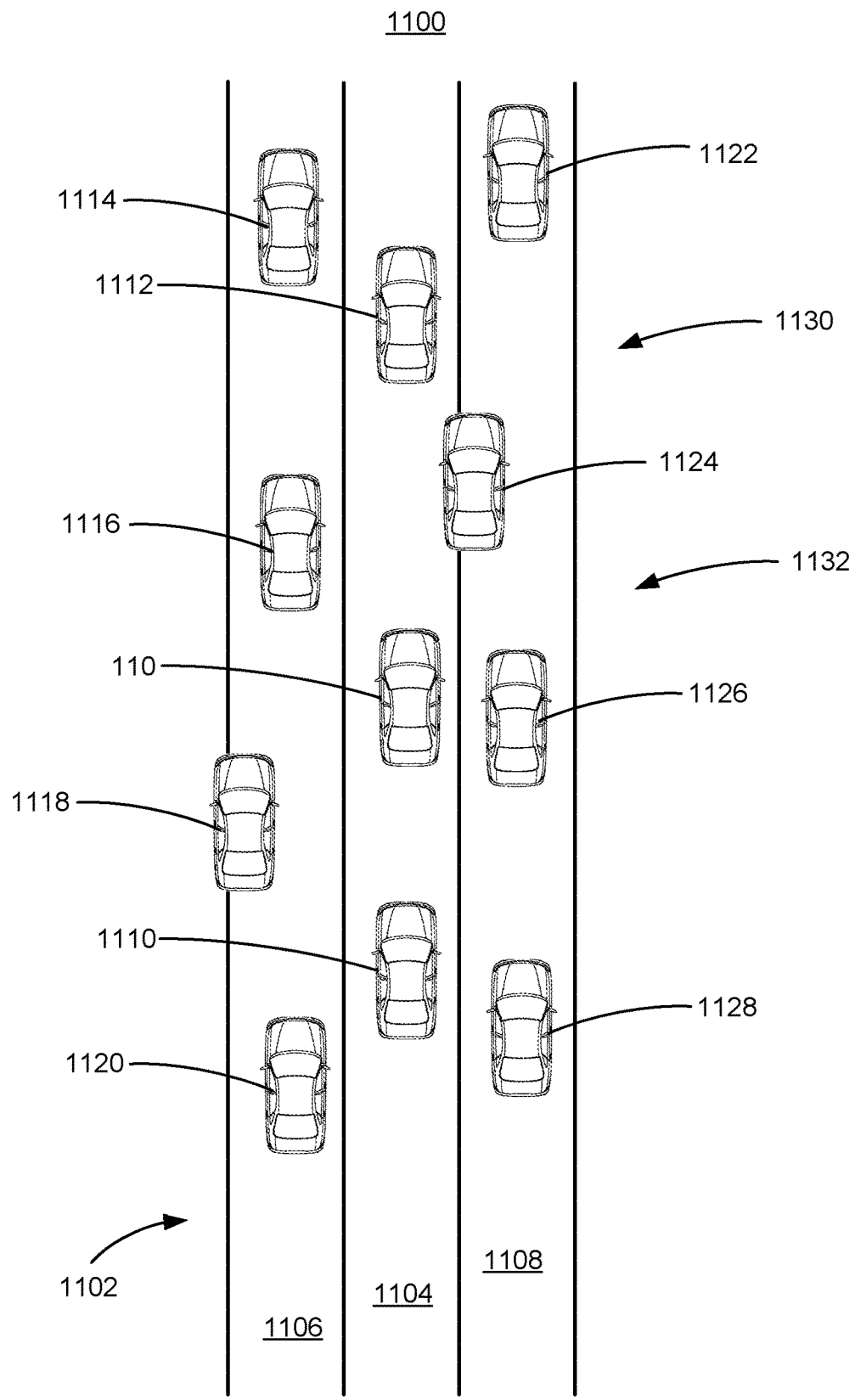
FIG. 11 is a diagram of example traffic scene including vehicles on a roadway.

FIG. 11 is a diagram of an example traffic scene 1100 including vehicles 110, 1110, 1112, 1114, 1116, 1118, 1120, 1122, 1124, 1126, 1128 (collectively vehicles 1130) traveling in a left lane 1106, a host lane 1104, and a right lane 1108, collectively roadway lanes 1102, where the lanes are designated with respect to host vehicle 110 as discussed above in relation to FIG. 8. In traffic scene 1100 vehicles 1130 can be down selected by a computing device 115 in a host vehicle 110 to form a set of down selected vehicles 1110, 1112, 1116, 1118, 1124, 1126, collectively down selected vehicles 1132 according to criteria discussed above in relation to FIG. 10, where vehicles 1130 closest to a host vehicle 110 ahead and behind the host vehicle 110 in a host roadway lane 1104 and a left and a right roadway lanes 1106, 1108 adjacent to the host roadway lane 1104 can be down selected to form a set of down selected vehicles 1132.

Traffic scene 1100 illustrates and example where vehicle path polynomial 1002, 1004, 1006 deviations can be due to deviations in down selected vehicle 1132 locations. In this example, deviations in second roadway lanes based on down selected vehicles 1132 can be caused by one or more down selected vehicles 1132 being out of place or deviating from the centers of their respective roadway lanes 1102. Deviations between first roadway lanes 808 and second roadway lanes based on down selected vehicles 1132 and can be determined by removing each down selected vehicle 1132 from the vehicle path polynomial calculation to determine whether the comparison between the vehicle path polynomial and its respective roadway lane 808 improves. A technique for determining that one or more of the down selected 1132 is deviating from a first roadway lane 808 is to determine the width of the vehicle path polynomial as it is determined based on down selected vehicles 1132. In examples where one or more down selected vehicles 1132, for example vehicles 1118, 1124, are deviating from the center of a first roadway lane 808, the vehicle path polynomials determined for the deviating vehicles 1118, 1124 will deviate from vehicle path polynomials determined for other down selected vehicles 1132 in the same roadway lane. In examples where there is deviation or miss alignment of a vehicle path polynomial greater than plus or minus one-half meter, it can be determined that one or more of the down selected vehicles 1132 is deviating from the center of a roadway lane 808. When this occurs, additional vehicles 1130 can be down selected from the set of vehicles 1130 in an environment around a vehicle to determine whether the one or more down selected vehicles 1132 is deviating from the center of a roadway lane 808. If the additional vehicles 1130 added to the set of down selected vehicles 1132 generate vehicle path polynomials that agree with the vehicle path polynomials generated by other down selected vehicles 1132, it confirms that the vehicles 1118, 1124 are deviating from the center of a roadway lane 808 and can be eliminated from the calculation of second roadway lanes. In this fashion down selected vehicles 1132 changing lanes or otherwise moving out of a roadway lane 808 can be ignored in the determination of second roadway lanes.

Figure 12:
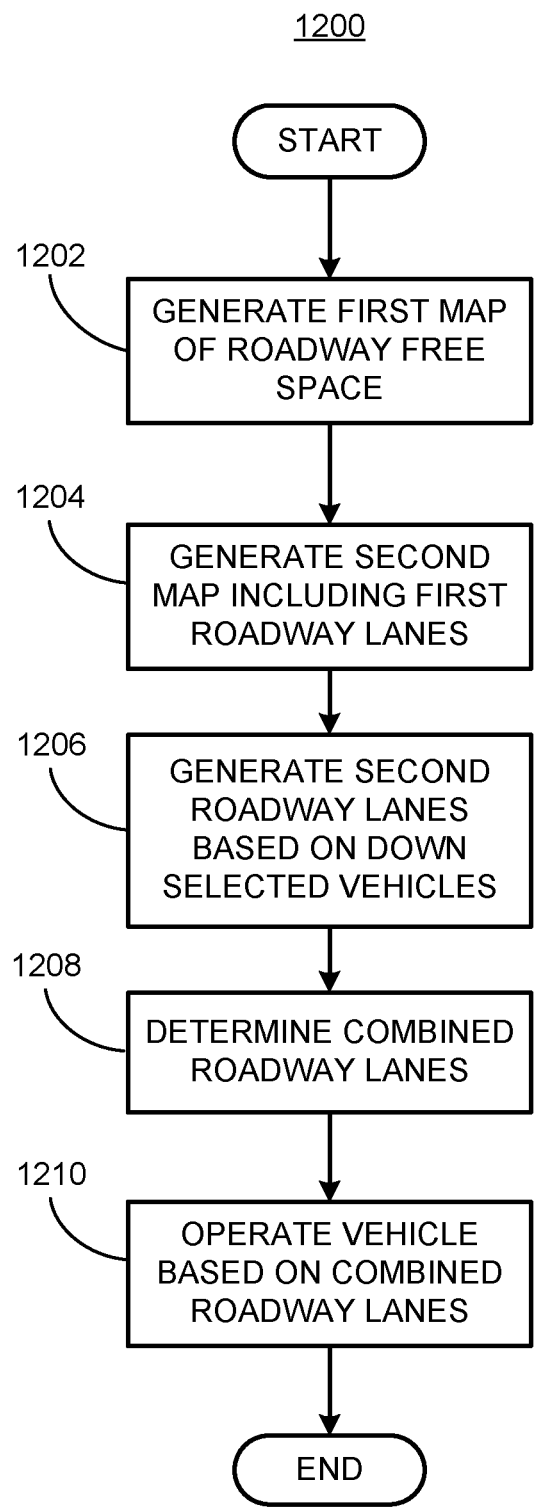
FIG. 12 is a flowchart diagram of an example process to operate a vehicle using roadway lanes.

FIG. 12 is a diagram of a flowchart, described in relation to FIGS. 1-11, of a process 1200 for operating a vehicle based on determined roadway lanes. Process 1200 can be implemented by a processor of computing device, taking as input information from sensors, and executing commands, and outputting object information, for example. Process 1200 includes multiple blocks that can be executed in the illustrated order. Process 1200 could alternatively or additionally include fewer blocks or can include the blocks executed in different orders.

Process 1200 begins at block 1202, where a computing device 115 in a host vehicle 110 determines a first map of roadway free space 616 based on vehicle sensor data as discussed above in relation to FIGS. 5 and 6, above. Roadway free space 616 is a region in an environment around a host vehicle 110 in which the host vehicle 110 can operate without leaving a roadway. The map of roadway free space 616 can also include objects including other vehicles 604, 606, 608, 610.

At block 1204 a computing device 115 determines a second map including roadway lanes. The second map is a vehicle coordinate system graph 700 including roadway lane markings 712. This second map can be generated by processing vehicle sensor data to determine roadway lane markings 712 as discussed above in relation to FIG. 7. The computing device can process B-splines corresponding to roadway lane markings 712 to form roadway lanes 808. The roadway lanes can be identified as a host roadway lane 804, a left roadway lane 802, a right roadway lane 806, or non-relevant roadway lane depending upon whether the roadway lane 808 includes a host vehicle 110, is adjacent to the left or right of a host roadway lane 804, or is not adjacent to a host roadway lane 804.

At block 1206 a computing device 115 can determine second roadway lanes based on vehicle path polynomials based on down selected vehicles as discussed above in relation to FIGS. 9 and 10. The second roadway lanes can be processed to determine if one or more of the down selected vehicles deviates from the center of a roadway lane and as a result can be replace in the set of down selected vehicles by comparing the B-splines formed by locations of the down selected vehicle to other B-splines formed by down selected vehicles as discussed in relation to FIG. 11, above.

At block 1208 a computing device 115 can combine the first roadway lanes 808 with second roadway lanes based on vehicle path polynomials based on down selected vehicles. If the first and second roadway lanes differ in a lateral by more than plus or minus one-half meter, the second roadway lane can be used instead of the first roadway lane 808, because the second roadway lanes are based on determined locations of vehicles 930 traveling on a roadway in an environment around a host vehicle 110.

At block 1210 a computing device 115 can operate the host vehicle 110 by determining a path polynomial 710 along which to operate the host vehicle 110. The computing device can operate the host vehicle 110 along the path polynomial by controlling vehicle powertrain, steering, and brakes via vehicle controllers 112, 113, 114. Following block 1210 process 1200 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A computer, comprising a processor; and
a memory, the memory including instructions executable by the processor to:
generate a first map, based on vehicle sensor data, of a free space on a roadway in which a first vehicle can operate without contacting roadway edges and non-stationary objects on the roadway, the first map including roadway lane markings in an environment around the first vehicle, wherein the non-stationary objects include one or more second vehicles;
generate a second map of free space in the environment around the first vehicle by determining a first plurality of B-splines defining first roadway lanes based on the roadway lane markings and the roadway edges included in the first map;
determine a second plurality of B-splines defining second roadway lanes based on determining locations of the non-stationary objects;
determine combined roadway lanes by combining the first plurality of B-splines defining the first roadway lanes and the second plurality of B-splines defining the second roadway lanes; and
operate the first vehicle based on the combined roadway lanes.

2. The computer of claim 1, wherein the first roadway lanes and the second roadway lanes are classified as one or more of a left lane, a right lane, a host lane and a non-relevant lane based on a location of the first vehicle.

3. The computer of claim 1, wherein the vehicle sensor data includes one or more of video data, lidar data, and radar data.

4. The computer of claim 1, the instructions including further instructions to determine the B-splines based on knots and controlled points, wherein the knots are points on the B-splines and the controlled points determine a shape of the B-splines between the knots based on third degree polynomial functions.

5. The computer of claim 1, the instructions including further instructions to determine object tracks based on determining a plurality of locations of the non-stationary objects in data acquired by vehicle sensors at successive time steps.

6. The computer of claim 5, the instructions including further instructions to determine B-splines corresponding to the second roadway lanes based on the object tracks.

7. The computer of claim 6, the instructions including further instructions to determine the combined roadway lanes based on combining the B-splines corresponding to the first roadway lanes with the B-splines corresponding to the second roadway lanes.

8. The computer of claim 7, the instructions including further instructions to include the B-splines corresponding to the second roadway lanes in the combined roadway lanes when the first roadway lanes and the second roadway lanes do not match.

9. The computer of claim 1, the instructions including further instructions to operate the first vehicle based on determining a steerable path polynomial based on the combined roadway lanes.

10. The computer of claim 9, the instructions including further instructions to operate the first vehicle on the steerable path polynomial by controlling vehicle powertrain, steering, and brakes.

11. A method, comprising:
generating a first map, based on vehicle sensor data, of a free space on a roadway in which a first vehicle can operate without contacting roadway edges and non-stationary objects on the roadway, the first map including roadway lane markings in an environment around the first vehicle, wherein the non-stationary objects include one or more second vehicles;
generating a second map of free space in the environment around the first vehicle by determining a first plurality of B-splines defining first roadway lanes based on the roadway lane markings and the roadway edges included in the first map;
determining a second plurality of B-splines defining second roadway lanes based on determining locations of the non-stationary objects;
determining combined roadway lanes by combining the first plurality of B-splines defining the first roadway lanes and the second plurality of B-splines defining the second roadway lanes; and
operating the first vehicle based on the combined roadway lanes.

12. The method of claim 11, wherein the first roadway lanes and the second roadway lanes are classified as one or more of a left lane, a right lane, a host lane and a non-relevant lane based on a location of the first vehicle.

13. The method of claim 11, wherein the vehicle sensor data includes one or more of video data, lidar data, and radar data.

14. The method of claim 11, further comprising determining the B-splines based on knots and controlled points, wherein the knots are points on the B-splines and the controlled points determine a shape of the B-splines between the knots based on third degree polynomial functions.

15. The method of claim 11, further comprising determining object tracks based on determining a plurality of locations of the non-stationary objects in data acquired by vehicle sensors at successive time steps.

16. The method of claim 15, further comprising determining B-splines corresponding to the second roadway lanes based on the object tracks.

17. The method of claim 16, further comprising determining the combined roadway lanes based on combining the B-splines corresponding to the first roadway lanes with the B-splines corresponding to the second roadway lanes.

18. The method of claim 17, further comprising including the B-splines corresponding to the second roadway lanes in the combined roadway lanes when the first roadway lanes and the second roadway lanes do not match.

19. The method of claim 11, further comprising operating the first vehicle based on determining a steerable path polynomial based on the combined roadway lanes.

20. The method of claim 19, further comprising operating the first vehicle on the steerable path polynomial by controlling vehicle powertrain, steering, and brakes.

* * * * *